United States Patent
Park et al.

(10) Patent No.: US 10,747,070 B2
(45) Date of Patent: Aug. 18, 2020

(54) LIQUID CRYSTAL DISPLAY DEVICE

(71) Applicant: Samsung Display Co., Ltd., Yongin-Si, Gyeonggi-Do (KR)

(72) Inventors: Ju Ki Park, Anseong-si (KR); Tae-Jong Jun, Suwon-si (KR); Youn Hak Jeong, Cheonan-si (KR); Won Jun Lee, Changwon-si (KR); Jin Joo Ha, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/424,394

(22) Filed: May 28, 2019

(65) Prior Publication Data

US 2020/0073184 A1    Mar. 5, 2020

(30) Foreign Application Priority Data

Sep. 4, 2018 (KR) .................. 10-2018-0105500
Oct. 25, 2018 (KR) .................. 10-2018-0128155

(51) Int. Cl.
*G02F 1/1343* (2006.01)
*G09G 3/36* (2006.01)

(52) U.S. Cl.
CPC ..... *G02F 1/134309* (2013.01); *G09G 3/3607* (2013.01); *G02F 2001/134345* (2013.01); *G02F 2201/123* (2013.01); *G09G 2300/0452* (2013.01)

(58) Field of Classification Search
CPC ... G02F 1/134309; G02F 2001/134345; G02F 2201/123; G02F 2201/52; G02F 1/133707; G02F 1/133753; G02F 1/134363; G02F 1/136286; G02F 2001/133757; G02F 2201/40; G09G 3/3607; G09G 2300/0452
See application file for complete search history.

(56) References Cited

U.S. PATENT DOCUMENTS

| | | | |
|---|---|---|---|
| 10,032,426 B2 | 7/2018 | Kim et al. | |
| 2001/0001567 A1 | 5/2001 | Lyu et al. | |
| 2017/0108746 A1* | 4/2017 | Jang | ............. G02F 1/134309 |
| 2019/0272783 A1* | 9/2019 | Huang | ............. G09G 3/2074 |

FOREIGN PATENT DOCUMENTS

| | | |
|---|---|---|
| KR | 10-0580383 B1 | 3/2007 |
| KR | 10-2009-0118391 A | 11/2009 |
| KR | 10-2011-0066724 A | 6/2011 |
| KR | 10-1480006 A | 1/2015 |
| KR | 10-1681487 A | 12/2016 |
| KR | 10-1726739 B1 | 4/2017 |
| KR | 10-1757476 B1 | 7/2017 |

* cited by examiner

*Primary Examiner* — Nelson M Rosario
(74) *Attorney, Agent, or Firm* — Innovation Counsel LLP

(57) ABSTRACT

A liquid crystal display device includes a first row including first, second, and third first-color pixels; a second row including fourth, fifth, and sixth first-color pixels; and a third row including seventh, eighth, and ninth first-color pixels. The first, fourth, and seventh first-color pixels are aligned. The second, fifth, and eighth first-color pixels are aligned. The third, sixth, and ninth first-color pixels are aligned. The second first-color pixel is disposed between the first and third first-color pixels. Each pixel electrode of the first, third, fifth, seventh, and ninth first-color pixels may receive a high voltage for a gray level. Each pixel electrode of the second, fourth, sixth, and eighth first-color pixels may receive a low voltage for a gray level lower than the high voltage for a gray level. Liquid crystal molecules in each pixel have two domain directions.

20 Claims, 10 Drawing Sheets

FIG. 1

| | | | | | | | |
|---|---|---|---|---|---|---|---|
| R H | G H | B H | R L | G L | B L | R H | G H | B H |

| | R | G | B | R | G | B | R | G | B | R | G | B |
|---|---|---|---|---|---|---|---|---|---|---|---|---|
| | E1 | E1 | E1 | E2 | E2 | E2 | E1 | E1 | E1 | E2 | E2 | E2 |
| | R | G | B | R | G | B | R | G | B | R | G | B |
| | E1 | E1 | E1 | E2 | E2 | E2 | E1 | E1 | E1 | E2 | E2 | E2 |
| | R | G | B | R | G | B | R | G | B | R | G | B |
| | E1 | E1 | E1 | E2 | E2 | E2 | E1 | E1 | E1 | E2 | E2 | E2 |
| | R | G | B | R | G | B | R | G | B | R | G | B |
| | E1 | E1 | E1 | E2 | E2 | E2 | E1 | E1 | E1 | E2 | E2 | E2 |

| | Y | | | | | | | 1000 |
|---|---|---|---|---|---|---|---|---|

X →

| R<br>E1 | G<br>E2 | B<br>E1 | R<br>E2 | G<br>E1 | B<br>E2 | R<br>E1 | G<br>E2 | B<br>E1 |
|---|---|---|---|---|---|---|---|---|
| R<br>E2 | G<br>E1 | B<br>E2 | R<br>E1 | G<br>E2 | B<br>E1 | R<br>E2 | G<br>E1 | B<br>E2 |
| R<br>E1 | G<br>E2 | B<br>E1 | R<br>E2 | G<br>E1 | B<br>E2 | R<br>E1 | G<br>E2 | B<br>E1 |
| R<br>E2 | G<br>E1 | B<br>E2 | R<br>E1 | G<br>E2 | B<br>E1 | R<br>E2 | G<br>E1 | B<br>E2 |

FIG. 7

| | Y | | | | 1000 | | | |
|---|---|---|---|---|---|---|---|---|
| R | G | B | R | G | B | R | G | B |
| E1 | E2 | E1 | E2 | E1 | E2 | E1 | E2 | E1 |
| R | G | B | R | G | B | R | G | B |
| E1 | E2 | E1 | E2 | E1 | E2 | E1 | E2 | E1 |
| R | G | B | R | G | B | R | G | B |
| E1 | E2 | E1 | E2 | E1 | E2 | E1 | E2 | E1 |
| R | G | B | R | G | B | R | G | B |
| E1 | E2 | E1 | E2 | E1 | E2 | E1 | E2 | E1 |

FIG. 10

| | | | | | | | | |
|---|---|---|---|---|---|---|---|---|
| | R H | G L | B H | R L | G H | B L | R H | G L | B H |
| | R L | G H | B L | R H | G L | B H | R L | G H | B L |
| | R H | G L | B H | R L | G H | B L | R H | G L | B H |
| | R L | G H | B L | R H | G L | B H | R L | G H | B L |

1000

LIQUID CRYSTAL DISPLAY DEVICE

CROSS-REFERENCE TO RELATED APPLICATION(S)

This application claims priority to and the benefits of Korean Patent Application No. 10-2018-0128155 filed in the Korean Intellectual Property Office on Oct. 25, 2018, and Korean Patent Application No. 10-2018-0105500 filed in the Korean Intellectual Property Office on Sep. 4, 2018; the entire contents of the Korean Patent Applications are incorporated herein by reference.

BACKGROUND

(a) Technical Field

The technical field relates to a liquid crystal display device.

(b) Description of the Related Art

A liquid crystal display device typically includes field generating electrodes (such as a pixel electrode and a common electrode) and a liquid crystal layer. Applying a voltage to the field generating electrodes may control orientations of the liquid crystal molecules of the liquid crystal layer, for controlling transmission of incident light to display an image.

In a liquid crystal display device, in order to improve lateral visibility, light transmittance may be reduced.

The above information disclosed in this Background section is for enhancement of understanding of the background of the application. This Background section may contain information that does not form the prior art that is already known in this country to a person of ordinary skill in the art.

SUMMARY

Embodiments may be related to a liquid crystal display with satisfactory lateral visibility.

In a liquid crystal display according to an embodiment, a plurality of pixels are disposed in a plurality of rows and a plurality of columns in a first direction and a second direction crossing the first direction. Each pixel includes: a gate line extending in a transverse direction; a data line crossing the gate line and extending in a longitudinal direction; a transistor connected to the gate line and the data line; and a pixel electrode connected to the transistor, wherein a pixel in which a high voltage is applied to the pixel electrode and a pixel in which a low voltage that is lower than the high voltage is applied to the pixel electrode are repeatedly disposed in the first direction, the pixel in which the high voltage is applied to the pixel electrode and the pixel in which the low voltage is applied to the pixel electrode are repeatedly disposed in the second direction, and liquid crystal molecules of each pixel have two domain directions.

The pixel electrode may have one electrode shape.

The pixel in which the high voltage is applied to the pixel electrode and the pixel in which the low voltage is applied to the pixel electrode may be repeatedly disposed three by three in the first direction.

The plurality of pixels may include a pixel including a pixel electrode having a first electrode structure and a pixel including a pixel electrode having a second electrode structure, and a domain direction of a liquid crystal molecule of the pixel including the pixel electrode having the first electrode structure and a domain direction of a liquid crystal molecule of the pixel including the pixel electrode having the second electrode structure may be different from each other.

Each of the pixel electrode having the first electrode structure and the pixel electrode having the second electrode structure may include: a longitudinal stem portion extending parallel to the data line; a plurality of minute branch portions extending in a direction that is inclined from the longitudinal stem portion, a protruding portion connected to the transistor, and a left region and a right region that are divided based on the longitudinal stem portion.

In the pixel electrode of the first electrode structure, the plurality of minute branch portions of the left region may extend to a left-lower side based on the longitudinal stem portion, and the plurality of minute branch portions of the right region may extend to a right-lower side based on the longitudinal stem portion.

In the pixel electrode of the second electrode structure, the plurality of minute branch portions of the left region may extend in a left-upper side based on the longitudinal stem portion, and the plurality of minute branch portions of the right region may extend to a right-upper side based on the longitudinal stem portion.

Among the plurality of rows, the pixel including the pixel electrode having the first electrode structure may be disposed in an odd-numbered row, and among the plurality of rows, the pixel including the pixel electrode having the second electrode structure may be disposed in an even-numbered row.

The pixel including the pixel electrode having the first electrode structure and the pixel including the pixel electrode having the second electrode structure may be repeatedly disposed three by three in the first direction.

The pixel including the pixel electrode having the first electrode structure and the pixel including the pixel electrode having the second electrode structure may be repeatedly disposed in the first direction, and the pixel including the pixel electrode having the first electrode structure and the pixel including the pixel electrode having the second electrode structure may be repeatedly disposed in the second direction.

Among the plurality of rows, the pixel including the pixel electrode having the first electrode structure may be disposed in an odd-numbered column, and among the plurality of rows, the pixel including the pixel electrode having the second electrode structure may be disposed in an even-numbered column.

Each of the pixel electrode having the first electrode structure and the pixel electrode having the second electrode structure may include a transverse stem portion extending parallel to the gate line, a plurality of minute branch portions extending in a direction that is inclined from the transverse stem portion, a protruding portion connected to the transistor, and an upper region and a lower region that are divided based on the transverse stem portion.

In the pixel electrode having the first electrode structure, the plurality of minute branch portions of the upper region may extend to the right-upper side based on the transverse stem portion, and the plurality of minute branch portions of the lower region may extend to the right-lower side based on the transverse stem portion.

In the pixel electrode having the second electrode structure, the plurality of minute branch portions of the upper region may extend to the left-upper side based on the transverse stem portion, and the plurality of minute branch portions of the lower region may extend to the left-lower side based on the transverse stem portion.

The pixel in which a high voltage is applied to the pixel electrode and the pixel in which a low voltage is applied to the pixel electrode may be disposed one by one in the first direction.

In a liquid crystal display according to an embodiment, a plurality of pixels are disposed in a plurality of rows and a plurality of columns in a first direction and a second direction crossing the first direction. Herein, each pixel includes: a gate line extending in a transverse direction; a data line crossing the gate line and extending in a longitudinal direction; a transistor connected to the gate line and the data line; and a pixel electrode connected to the transistor, wherein the pixel electrode has one electrode shape, the pixel in which the high voltage is applied to the pixel electrode and the pixel in which the low voltage that is lower than the high voltage is applied to the pixel electrode are repeatedly disposed three by three in the first direction. The pixel in which the high voltage is applied to the pixel electrode and the pixel in which the low voltage is applied to the pixel electrode are repeatedly disposed in the second direction, and liquid crystal molecules of each pixel have two domain directions.

An embodiment may be related to a liquid crystal display device. The liquid crystal display device may include a first pixel row, a second pixel row, and a third pixel row. The first pixel row may include a first first-color pixel, a second first-color pixel, and a third first-color pixel. The second pixel row may include a fourth first-color pixel, a fifth first-color pixel, and a sixth first-color pixel. The third pixel row may include a seventh first-color pixel, an eighth first-color pixel, and a ninth first-color pixel. Each of the first pixel row, the second pixel row, and the third pixel row may extend in a first direction. The second pixel row may be disposed between the first pixel row and the third pixel row and may immediately neighbor each of the first pixel row and the third pixel row. The features may be appreciated from one or more of FIG. 1, FIG. 2, FIG. 3, FIG. 4, FIG. 5, FIG. 6, FIG. 7, FIG. 8, FIG. 9, and FIG. 10; and related description.

The first first-color pixel, the fourth first-color pixel, and the seventh first-color pixel may be aligned in a second direction different from the first direction. The second first-color pixel, the fifth first-color pixel, and the eighth first-color pixel may be aligned in the second direction. The third first-color pixel, the sixth first-color pixel, and the ninth first-color pixel may be aligned in the second direction. The second first-color pixel may be disposed between the first first-color pixel and the third first-color pixel. The features may be appreciated from one or more of FIG. 1, FIG. 2, FIG. 3, FIG. 4, FIG. 5, FIG. 6, FIG. 7, FIG. 8, FIG. 9, and FIG. 10; and related description.

Each of a pixel electrode of the first first-color pixel, a pixel electrode of the third first-color pixel, a pixel electrode of the fifth first-color pixel, a pixel electrode of the seventh first-color pixel, and a pixel electrode of the ninth first-color pixel may receive a high voltage for a gray level. Each of a pixel electrode of the second first-color pixel, a pixel electrode of the fourth first-color pixel, a pixel electrode of the sixth first-color pixel, and a pixel electrode of the eighth first-color pixel receives a low voltage for a gray level lower than the high voltage for a gray level. The features may be appreciated from one or more of FIG. 1 and FIG. 10; and related description.

Liquid crystal molecules in each pixel in each of the first pixel row, the second pixel row, and the third pixel row may have two domain directions. The features may be appreciated from one or more of FIG. 3, FIG. 4, FIG. 8, and FIG. 9; and related description.

The first pixel row may further include a first second-color pixel and a first third-color pixel both disposed between the first first-color pixel and the second first-color pixel. The first second-color pixel may be disposed between the first first-color pixel and the first third-color pixel. A pixel electrode of the first third-color pixel may receive the high voltage for a gray level. The features may be appreciated from one or more of FIG. 1 and FIG. 10; and related description.

A pixel electrode of the first second-color pixel may receive the high voltage for a gray level or the low voltage for a gray level. The features may be appreciated from one or more of FIG. 1 and FIG. 10; and related description.

The pixel electrode of the first first-color pixel may have a first electrode structure. Each or one of the pixel electrode of the second first-color pixel and the pixel electrode of the fourth first-color pixel may have a second electrode structure. A plan view of the first electrode structure may be a mirror image of a plan view of the second electrode structure. The features may be appreciated from one or more of FIG. 2, FIG. 3, FIG. 4, FIG. 5, FIG. 6, FIG. 7, FIG. 8, and FIG. 9; and related description.

The first electrode structure may include the following elements: a longitudinal stem portion extending in the second direction; and a plurality of minute branch portions extending obliquely from the longitudinal stem portion. The features may be appreciated from one or more of FIG. 3 and FIG. 4; and related description.

The plurality of minute branch portions may include a first set of minute branch portions and a second set of minute branch portions. A plan view of the first set of minute branch portions may be a mirror image of a plan view of the second set of minute branch portions with reference to the longitudinal stem portion. The features may be appreciated from one or more of FIG. 3 and FIG. 4; and related description.

A plan view of minute branch portions of the first electrode structure may be a mirror image a plan view of minute branch portions of the second electrode structure according to the second direction. The features may be appreciated from one or more of FIG. 3 and FIG. 4; and related description.

Each pixel electrode in the first pixel row may have the first pixel electrode structure. Each pixel electrode in the second pixel row may have the second pixel electrode structure. Each pixel electrode in the third pixel row may have the first pixel electrode structure. The features may be appreciated from FIG. 2 and related description.

Each pixel electrode of the first first-color pixel, the first second-color pixel, the first third-color pixel, and the third first-color pixel may have the first pixel electrode structure. The pixel electrode of the second first-color pixel may have the second pixel electrode structure. The features may be appreciated from FIG. 5 and related description.

Each pixel electrode of the first first-color pixel, the first third-color pixel, and the third first-color pixel may have the first pixel electrode structure. Each pixel electrode of the first second-color pixel, the second first-color pixel, and the fourth first-color pixel may have the second pixel electrode structure. The features may be appreciated from FIG. 6 and related description.

Each pixel electrode of the first first-color pixel, the first third-color pixel, the third first-color pixel, the fourth first-color pixel, the sixth first-color pixel, the seventh first-color pixel, and the ninth first-color pixel may have the first pixel electrode structure. Each pixel electrode of the first second-color pixel, the second first-color pixel, the fifth first-color pixel, and the eighth first-color pixel may have the second pixel electrode structure. The features may be appreciated from FIG. 7 and related description.

The first electrode structure may include the following elements: a transverse stem portion extending in the first direction; and a plurality of minute branch portions extending obliquely from the transverse stem portion. The features may be appreciated from one or more of FIG. 8 and FIG. 9; and related description.

The plurality of minute branch portions may include a first set of minute branch portions and a second set of minute branch portions. A plan view of the first set of minute branch portions may be a mirror image of a plan view of the second set of minute branch portions with reference to the transverse stem portion. The features may be appreciated from one or more of FIG. 8 and FIG. 9; and related description.

A plan view of minute branch portions of the first electrode structure may be a mirror image a plan view of minute branch portions of the second electrode structure according to the first direction. The features may be appreciated from one or more of FIG. 8 and FIG. 9; and related description.

Each pixel electrode in the first pixel row may have the first pixel electrode structure. Each pixel electrode in the second pixel row may have the second pixel electrode structure. Each pixel electrode in the third pixel row may have the first pixel electrode structure. The features may be appreciated from FIG. 2 and related description.

Each pixel electrode of the first first-color pixel, the first second-color pixel, the first third-color pixel, and the third first-color pixel may have the first pixel electrode structure. The pixel electrode of the second first-color pixel may have the second pixel electrode structure. The features may be appreciated from FIG. 5 and related description.

Each pixel electrode of the first first-color pixel, the first third-color pixel, and the third first-color pixel may have the first pixel electrode structure. Each pixel electrode of the first second-color pixel, the second first-color pixel, and the fourth first-color pixel may have the second pixel electrode structure. The features may be appreciated from FIG. 6 and related description.

Each pixel electrode of the first first-color pixel, the first third-color pixel, the third first-color pixel, the fourth first-color pixel, the sixth first-color pixel, the seventh first-color pixel, and the ninth first-color pixel may have the first pixel electrode structure. Each pixel electrode of the first second-color pixel, the second first-color pixel, the fifth first-color pixel, and the eighth first-color pixel may have the second pixel electrode structure. The features may be appreciated from FIG. 7 and related description.

The high voltage for a gray level and the low voltage for a gray level may satisfy a gamma value of the liquid crystal display device, if combined for every gray level.

The gamma value of the liquid crystal display device may be 2.2 or 2.4, and the low voltage for a gray level may satisfy one of gamma values from 3.0 to 4.0.

According to embodiments, a liquid crystal display may provide satisfactory lateral visibility without requiring significant transmittance reduction.

BRIEF DESCRIPTION OF THE DRAWINGS

FIG. 1 is a plan view schematically showing a pixel electrode voltage arrangement of a liquid crystal display according to an embodiment.

FIG. 5 is a plan view schematically showing a pixel electrode structure arrangement of a liquid crystal display according to an embodiment.

FIG. 6 is a plan view schematically showing a pixel electrode structure arrangement of a liquid crystal display according to an embodiment.

FIG. 7 is a plan view schematically showing a pixel electrode structure arrangement of a liquid crystal display according to an embodiment.

FIG. 10 is a plan view schematically showing a pixel electrode voltage arrangement of a liquid crystal display according to an embodiment.

DETAILED DESCRIPTION OF EMBODIMENTS

Figure 2:
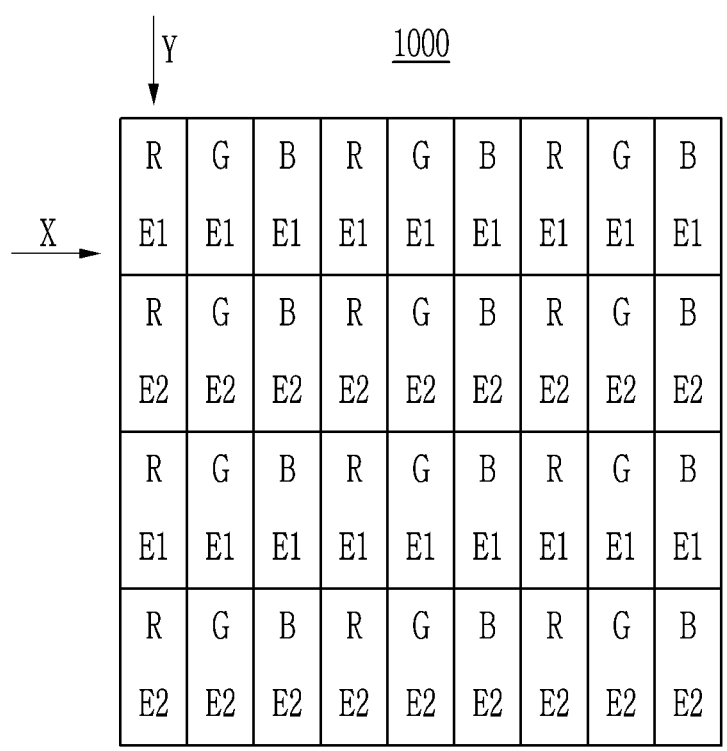
FIG. 2 is a plan view schematically showing a pixel electrode structure arrangement of a liquid crystal display according to an embodiment.

Example embodiments are described with reference to the accompanying drawings. As those skilled in the art would realize, the described embodiments may be modified in various ways.

Like reference numerals may designate like elements throughout the specification.

In the drawings, sizes and/or thicknesses of layers, films, panels, regions, etc., may be exaggerated for clarity.

Although the terms "first," "second," etc. may be used herein to describe various elements, these elements, should not be limited by these terms. These terms may be used to distinguish one element from another element. Thus, a first element may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element. In the specification, the word "on" or "above" may mean positioned on or below an object, and does not necessarily mean positioned on the upper side of the object based on a gravitational direction.

Unless explicitly described to the contrary, the word "comprise" and variations such as "comprises" or "comprising" may imply the inclusion of stated elements but not the exclusion of any other elements.

The term "line" or "layer" may mean a portion of a line or a portion of a layer. The term "pixel electrode structure"

may mean a combination-configuration of a conductive stem and one or more conductive branches.

Figure 1:
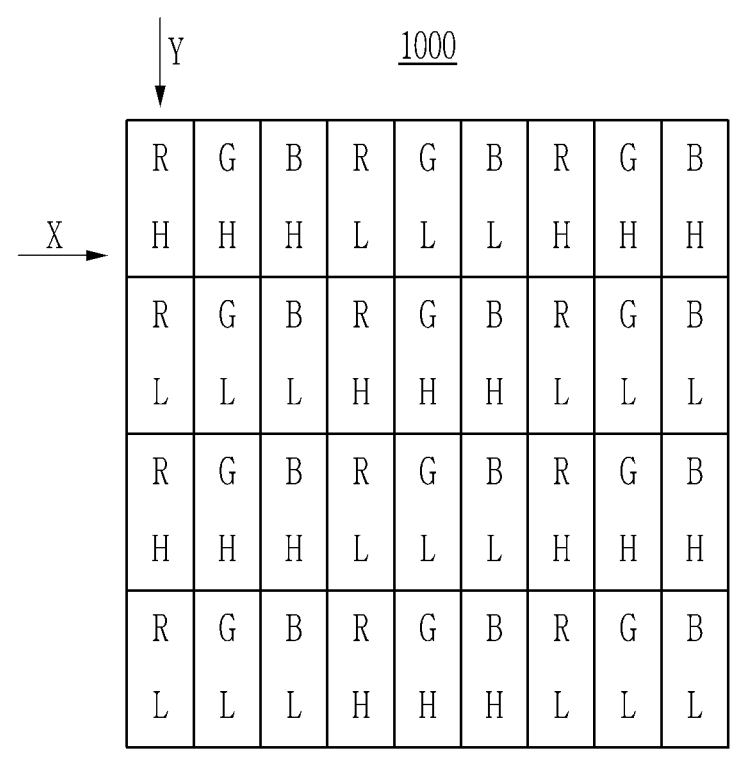

FIG. 1 is a schematic plan view indicating voltages applied to pixel electrodes of pixels of a liquid crystal display device according to an embodiment, and FIG. 2 is a schematic plan view indicating structures of pixel electrodes of pixels of a liquid crystal display device according to an embodiment.

Referring to FIG. 1 and FIG. 2, a liquid crystal display 1000 includes a plurality of pixels. The plurality of pixels includes pixels R (or first-color pixels R), pixels G (or second-color pixels G), and pixels B (or third-color pixels B). The pixels are disposed in a plurality of rows (extending in a first direction X) and a plurality of columns (extending in a second direction Y). In a first row, a pixel R, a pixel G, and a pixel B are sequentially disposed in the first direction X; a pattern including a pixel R, a pixel G, and a pixel B is repeated in the first direction X. The first direction X is different from (e.g., perpendicular to) the second direction Y.

Each pixel R may be a red pixel for displaying red. Each pixel G may be a green pixel for displaying green. Each pixel B may be a blue pixel for displaying blue.

Each of pixels R, G, and B includes one pixel electrode, and a voltage may be applied to the pixel electrode of each of pixels R, G, and B. In an embodiment, a first pattern may include three pixels with pixel electrodes receiving a high voltage H and three pixels with pixel electrodes receiving a low voltage L lower than the high voltage H; the first pattern may be repeated in the first direction X. A second pattern may include one pixel with a pixel electrode receiving the high voltage H and one pixel with a pixel electrode receiving the low voltage L; the second pattern may be repeated in the second direction Y.

To display an image, set voltages of the high voltage H and the low voltage L are already prepared for each gray level. The high voltage H and the low voltage L have different voltage values with respect to each gray level, and the low voltage L is lower than the high voltage H in almost every set voltages. The high voltage H and the low voltage L in some of set voltages may have the same voltages.

The high voltage H and the low voltage L may be determined according to the following procedures.

The gamma value for the display device is firstly determined. Generally, the gamma value for the display device is 2.2 or 2.4. According to embodiments, the gamma value for the display device may have between 2.2 and 2.4 or other different value.

The gamma value for the low voltage L is determined. In embodiments, the low voltage for a gray level satisfies one of gamma values from 3.0 to 4.0.

Then the high voltage H for a gray level is determined to satisfy the determined gamma value for the display device with the low voltage L for the gray level. Thus, the high voltage for a gray level and the low voltage for a gray level satisfy a gamma value of the liquid crystal display device, if combined for every gray level.

Hereinafter, the high voltage H and the low voltage L are mentioned without explaining the above relationship between them. However, the high voltage H may have different voltage values for gray levels to be displayed, and the low voltage L may also have different voltage values for gray levels to be displayed.

Voltages applied to pixel electrodes of pixels are indicated in FIG. 1.

In the first row (e.g., the top row), the high voltage H is applied to the pixel electrodes of the first, second, and third pixels R, G and B; the low voltage L is applied to the pixel electrodes of the fourth, fifth, and sixth pixels R, G, and B. The high voltage H is applied to the pixel electrodes of the seventh, eighth, and ninth pixels R, G, and B in the first row; the low voltage L is applied to the pixel electrodes of the tenth, eleventh, and twelfth pixels R, G, and B in the first row.

In the first column (e.g., the left most column), the high voltage H is applied to the pixel electrode of the first pixel (R), the low voltage L is applied to the pixel electrode of the second pixel (R), the high voltage H is applied to the pixel electrode of the third pixel (R), and the low voltage L is applied to the pixel electrode of the fourth pixel (R).

The pixel electrode included in each pixel of the liquid crystal display 1000 may have a first electrode structure E1 or a second electrode structure E2.

As indicated in FIG. 2, the pixel electrodes of pixels adjacent in the first direction X may have the same electrode structure, and the pixel electrodes of pixels immediately adjacent in the second direction Y have different electrode structures.

The pixel electrode of each of pixels R, G, and B in the first row has the first electrode structure E1. The pixel electrode of each of pixels R, G, and B in the second row has the second electrode structure E2. The pixel electrode of each of pixels R, G, and B in the third row has the first electrode structure E1. The pixel electrode of each of pixels R, G, and B in the fourth row has the second electrode structure E2. That is, the pixel electrodes of pixels R, G, and B disposed in each odd-numbered row has the first electrode structure E1, and the pixel electrodes of pixels R, G, and B disposed in each even-numbered row has the second electrode structure E2.

In the first column, the pixel electrode of the first pixel (R) has the first electrode structure E1, the pixel electrode of the second pixel (R) has the second electrode structure E2, the pixel electrode of the third pixel (R) has the first electrode structure E1, and the pixel electrode of the fourth pixel (R) has the second electrode structure E2. A pattern may include a pixel including a pixel electrode having the first electrode structure E1 and a pixel including a pixel electrode having the second electrode structure E2; the pattern may be repeated in the second direction Y.

Figure 3:
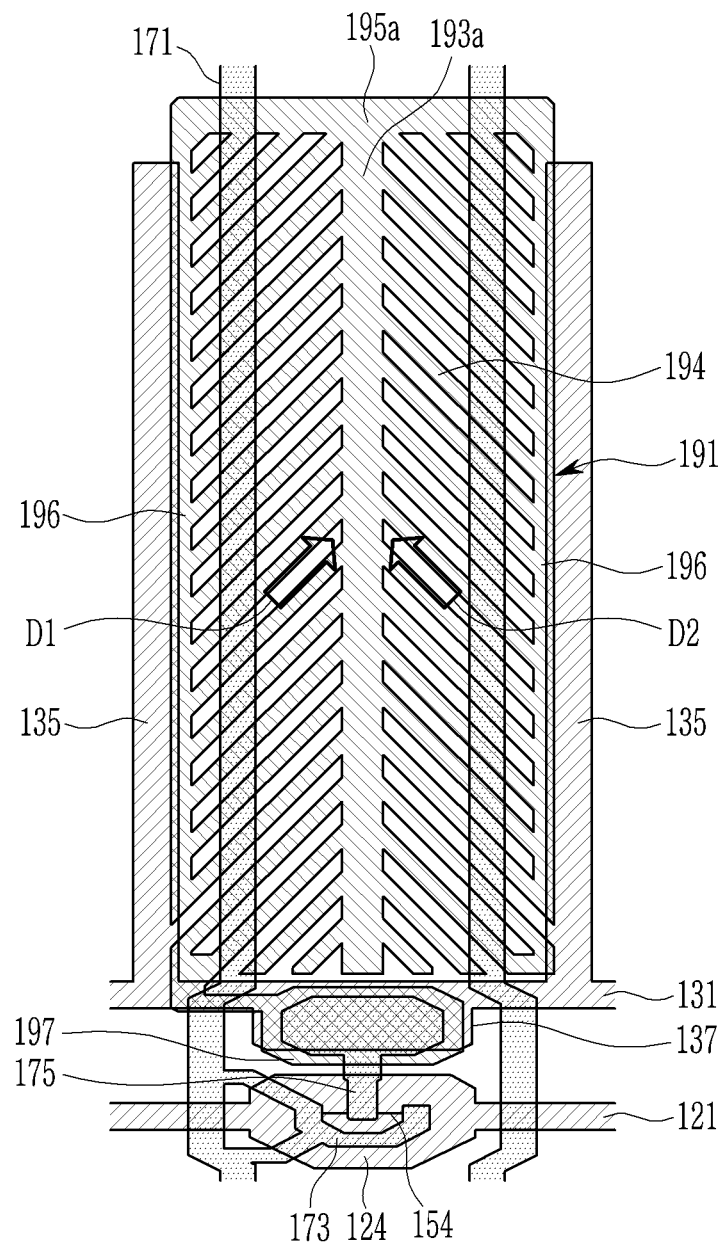
FIG. 3 is a plan view schematically showing a layout of one pixel of a liquid crystal display according to an embodiment.
Figure 4:
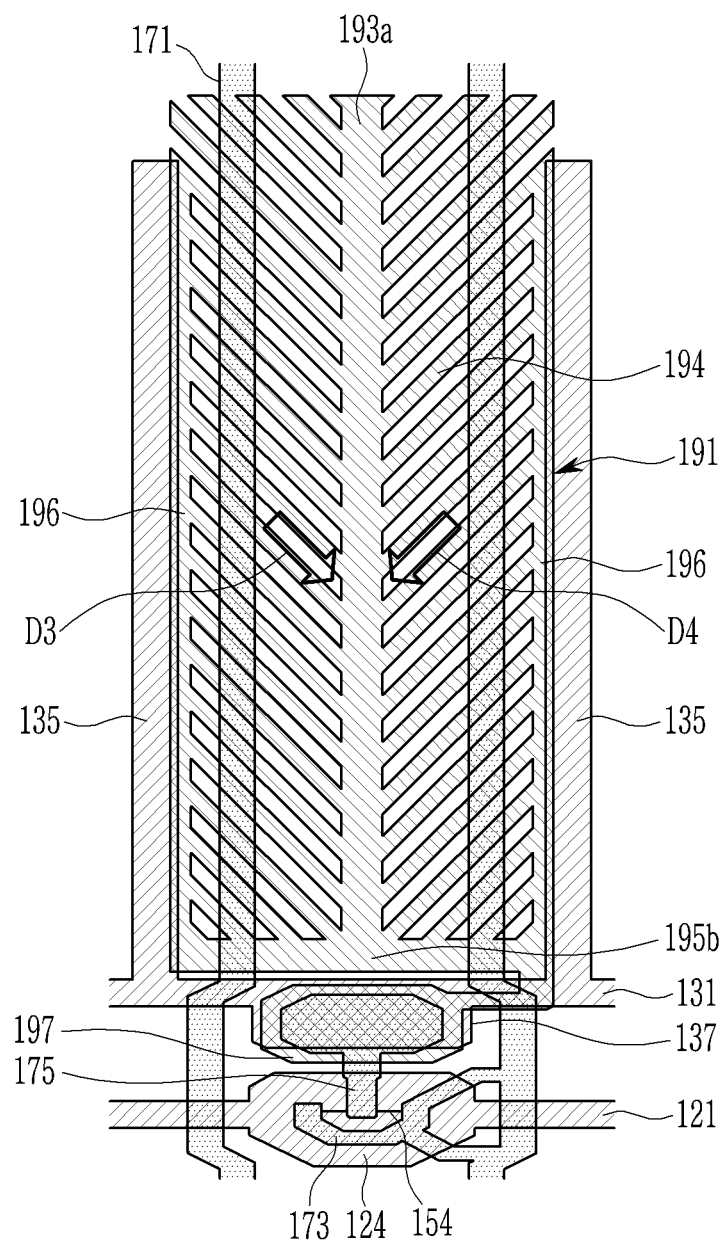
FIG. 4 is a plan view schematically showing a layout of one pixel of a liquid crystal display according to an embodiment.

In an embodiment, the voltage application for pixel electrodes of pixels shown in FIG. 2 may be according to FIG. 10. Each of FIG. 3 and FIG. 4 is a plan view schematically showing a layout of one pixel of a liquid crystal display according to an embodiment. The pixel electrode included in the pixel according to FIG. 3 has a first electrode structure E1, and the pixel electrode included in the pixel according to FIG. 4 has a second electrode structure E2. Each of FIG. 3 and FIG. 4 illustrates one integral pixel electrode that is not separated.

Referring to FIG. 3, one pixel of the liquid crystal display includes a gate line 121, a storage electrode line 131, a semiconductor layer 154, a data line 171, a drain electrode 175, and a pixel electrode 191. The liquid crystal display further includes a liquid crystal layer (not shown), a common electrode (not shown), and a color filter (not shown). The liquid crystal layer overlaps the common electrode and the pixel electrode 191, and the common electrode and the pixel electrode 191 may overlap each other or may be adjacent to each other. The common electrode and the pixel electrode 191 may provide an electric field to the liquid crystal layer.

The gate line 121 extends in a horizontal direction (e.g., the first direction X) and may transmit a gate signal. The gate line 121 includes a gate electrode 124 protruding upward and downward with respect to the gate line 121.

The storage electrode line 131 is separated from the gate line 121, extends in the horizontal direction, and transmits a predetermined voltage such as a common voltage Vcom. The storage electrode line 131 includes a pair of storage electrodes 135 extending upwardly from the storage electrode line 131, and an extension portion 137 protruding downward from the storage electrode line 131.

The data line 171 may transmit a data signal, may extend in a vertical direction (e.g., the second direction Y), and may intersect the gate line 121 and the storage electrode line 131. The data line 171 is insulated from the gate line 121 and the storage electrode line 131. The data line 171 includes a source electrode 173 protruding from the data line 171 to the gate electrode 124. The source electrode 173 overlaps the gate electrode 124 and may have a U-shaped bent structure.

The drain electrode 175 includes a portion overlapping the gate electrode 124 and a portion overlapping the extension portion 137 of the storage electrode line 131. The drain electrode 175 is spaced apart from the source electrode 173.

The semiconductor layer 154 overlaps the gate electrode 124. The semiconductor layer 154 may be disposed between the gate electrode 124, and the source electrode 173 and the drain electrode 175, in a cross-sectional view. The gate electrode 124, the source electrode 173, the drain electrode 175, and the semiconductor layer 154 form a transistor, and the channel of the transistor is formed in the semiconductor layer 154 between the source electrode 173 and the drain electrode 175 which are spaced from each other.

The pixel electrode 191 is connected to the drain electrode 175. Specifically, the pixel electrode 191 is connected to the drain electrode 175 portion overlapping the extension portion 137 of the storage electrode line 131. The pixel electrode 191 is an integral electrode that includes directly connected portions.

The pixel electrode 191 includes a longitudinal stem portion 193a, a plurality of minute branch portions 194, a first transverse connection portion 195a, a longitudinal connection portion 196, and a protruding portion 197.

The longitudinal stem portion 193a extends in a vertical direction, and minute branch portions 194 extend in an inclined direction from the longitudinal stem portions 193a. The first transverse connection portion 195a connects the upper portion of the longitudinal stem portion 193a and ends of minute branch portions 194, and a longitudinal connection portion 196 is connected to ends of minute branch portions 194. The protruding portion 197 is connected to the drain electrode 175 portion overlapping the extension portion 137 of the storage electrode line 131.

The outer boundary of the pixel electrode 191 is substantially a quadrangle, and the corresponding area is divided into a left region and a right region based on the longitudinal stem portion 193a.

Minute branch portions 194 extend obliquely toward lower left from the longitudinal stem portion 193a in the left region, and minute branch portions 194 extend obliquely toward lower right from the longitudinal stem portion 193a in the right region. A minute branch portion 194 may form an angle of approximately 45 degrees or 135 degrees with the longitudinal stem portion 193a.

The liquid crystal layer (not shown) contains liquid crystal molecules that are arranged parallel to minute branch portions 194. Since minute branch portions 194 extend in different directions in the left region and the right region of the pixel electrode 191, the domain directions of the liquid crystal molecules in the left region and the right region of the pixel electrode 191 are different from each other. Specifically, in the left region and the right region of the pixel electrode 191, the liquid crystal molecules are laid toward the longitudinal stem portion 193a, and the liquid crystal molecules have a first domain direction D1 in the left region and have a second domain direction D2 in the right region. The first domain direction D1 is toward upper right based on the gate line 121, and the second domain direction D2 is toward upper left based on the gate line 121.

Referring to FIG. 4, one pixel of the liquid crystal display includes a gate line 121, a storage electrode line 131, a semiconductor layer 154, a data line 171, a drain electrode 175, and a pixel electrode 191. The liquid crystal display further includes a liquid crystal layer (not shown), a common electrode (not shown), and a color filter (not shown). The liquid crystal layer overlaps the common electrode and the pixel electrode 191, and the common electrode and the pixel electrode 191 may overlap each other or may be adjacent to each other. The common electrode and the pixel electrode 191 generate the electric field to the liquid crystal layer.

The structure of the gate line 121, the storage electrode line 131, the semiconductor layer 154, and the drain electrode 175 of one pixel is the same as or analogous to the structure of the gate line 121, the storage electrode line 131, the semiconductor layer 154, and the drain electrode 175 of one pixel according to FIG. 3.

The data line 171 may transmit a data signal, may extend in a vertical direction, and may intersect the gate line 121 and the storage electrode line 131. The data line 171 is insulated from the gate line 121 and the storage electrode line 131. The data line 171 includes the source electrode 173 protruding from the data line 171 to the gate electrode 124. The source electrode 173 overlaps the gate electrode 124 and may have the U-shaped bent structure.

Compared with the pixel according to FIG. 3, the extending direction of the source electrode 173 shown in FIG. 4 is opposite to the extending direction of the source electrode 173 shown in FIG. 3.

The pixel electrode 191 is connected to the drain electrode 175. Specifically, the pixel electrode 191 is connected to the drain electrode 175 portion overlapping the extension portion 137 of the storage electrode line 131. The pixel electrode 191 is an integral electrode.

The pixel electrode 191 includes a longitudinal stem portion 193a, minute branch portions 194, a second transverse connection portion 195b, a longitudinal connection portion 196, and a protruding portion 197.

The longitudinal stem portion 193a extends in the vertical direction, and minute branch portions 194 extend in the inclined direction from the longitudinal stem portions 193a. The second transverse connection portion 195b connects the lower portion of the longitudinal stem portion 193a and ends of minute branch portions 194, and a longitudinal connection portion 196 is connected to ends of minute branch portions 194. The protruding portion 197 is connected to the drain electrode 175 portion overlapping the extension portion 137 of the storage electrode line 131.

The outer boundary of the pixel electrode 191 is substantially a quadrangle, and the corresponding area is divided into the left region and the right region based on the longitudinal stem portion 193a.

Minute branch portions 194 extend obliquely toward upper left in the left region, and minute branch portions 194 extend obliquely toward upper right in the right region. A minute branch portion 194 may form an angle of approximately 45 degrees or 135 degrees with the longitudinal stem portion 193a.

The liquid crystal layer (not shown) contains liquid crystal molecules that are arranged parallel to the minute branch portions 194. Since minute branch portions 194 extend in different directions in the left region and the right region of the pixel electrode 191, the domain directions of the liquid crystal molecules in the left region and the right region of the pixel electrode 191 are different from each other. Specifically, in the left region and the right region of the pixel electrode 191, the liquid crystal molecules are laid toward the longitudinal stem portion 193a, and the liquid crystal molecules have a third domain direction D3 in the left region and a fourth domain direction D4 in the right region. The third domain direction D3 is toward lower right based on the gate line 121, and the fourth domain direction D4 is toward lower left based on the gate line 121.

The pixel electrode of the pixel according to FIG. 3 has the first electrode structure E1, and the pixel electrode of the pixel according to FIG. 4 has the second electrode structure E2, such that the liquid crystal molecules of the pixel according to each of FIG. 3 and FIG. 4 have two domain directions. A plan view of the domain directions of the liquid crystal molecules of the pixel according to FIG. 3 may be a mirror image of a plan view of the domain directions of the liquid crystal molecules of the pixel according to FIG. 4.

In a liquid crystal display according to an embodiment, as each pixel includes one integral pixel electrode that is not divided, the transmittance of the display device may be satisfactory.

According to an embodiment, the above-discussed first (voltage application) pattern is repeated in the first direction X, the above-discussed second (voltage application) pattern is repeated in the second direction Y, the pixel electrodes of pixels adjacent in the first direction X have the same electrode structure, and the pixel electrodes of pixels immediately adjacent in the second direction Y have the different electrode structures from each other. Advantageously, lateral visibility and lateral roughness of the liquid crystal display device may be optimized. The lateral roughness refers to a phenomenon in which, when viewed from the side of a liquid crystal display device, some pixels are turned off differently than when viewed from the front, resulting in a visually rough appearance.

In embodiments, it is possible to prevent a color separation phenomenon such as a greenish defect or a magentaish defect appearing at the edge portion of a liquid crystal display.

FIG. 5 is a plan view schematically showing a pixel structure arrangement of a liquid crystal display according to an embodiment. The arrangement of the voltage application for the pixel electrodes of the pixels shown in FIG. 5 may be according to FIG. 1 or FIG. 10.

Referring to FIG. 5, in the liquid crystal display 1000 a pixel electrode structure may include three consecutive pixels having the first pixel electrode structure and three consecutive pixels having the second electrode structure; the pixel electrode pattern may be repeated in the first direction X for each row. The pixel electrodes of adjacent pixels in the second direction Y have the same electrode structure.

In each row, the pixel electrodes of the first, second, and third pixels R, G, and B have the first electrode structure E1; the pixel electrodes of the fourth, fifth, and sixth pixels R, G, and B have the second electrode structure E2; the pixel electrodes of the seventh, eighth, and ninth pixels R, G, and B have the first electrode structure E1; and the pixel electrodes of the tenth, eleventh, and twelfth pixels R, G, and B have the second electrode structure E2.

The pixel electrode of each pixel in the first, second, and third columns has the first electrode structure E1. The pixel electrode of each pixel in the fourth, fifth, and sixth columns has the second electrode structure E2. The pixel electrode of each pixel in the seventh, eighth, and ninth columns has the first electrode structure E1. The pixel electrode of each pixel in the second direction Y in the tenth, eleventh, and twelfth columns has the second electrode structure E2. The pixel electrodes of adjacent pixels in the second direction Y have the same electrode structure.

Table 1 shows average values of upper-lower luminance and left-right luminance of a liquid crystal display device according to each of Embodiment 1 and Embodiment 2.

Embodiment 1 and Embodiment 2 may be a liquid crystal display according to FIG. 2 and a liquid crystal display according to FIG. 5, respectively. In each of Embodiment 1 and Embodiment 2, the arrangement of pixel electrode voltage application is according to FIG. 1.

TABLE 1

|  | Embodiment 1 | | Embodiment 2 | |
| --- | --- | --- | --- | --- |
|  | Upper-lower | Left-right | Upper-lower | Left-right |
| Average luminance (cd/m$^2$) | 39.6 | 43.9 | 39.9 | 43.9 |

Referring to Table 1, in Embodiment 1 and Embodiment 2, the differences between the upper-lower average luminance and the left-right average luminance are 4.3 cd/m$^2$ and 4.0 cd/m$^2$, respectively, so it may be confirmed that differences between the upper-lower average luminance and the left-right average luminance are almost negligible. Since the differences between the upper-lower average luminance and the left-right luminance are insignificant, it may be confirmed that Embodiment 1 and Embodiment 2 may provide satisfactory lateral visibility.

Each of FIG. 6 and FIG. 7 is a plan view schematically showing a pixel electrode structure arrangement of a liquid crystal display according to an embodiment. The arrangement of pixel electrode voltage application for pixels in FIG. 6 and FIG. 7 may be according to FIG. 1 or FIG. 10.

Referring to FIG. 6, in the liquid crystal display 1000, the pixel electrodes of the pixels disposed immediately adjacent to each other in the first direction X and the second direction Y have the different electrode structures.

In the first row, the pixel electrode of the first pixel R has the first electrode structure E1, the pixel electrode of the second pixel G has the second electrode structure E2, the pixel electrode of the third pixel B has the first electrode structure E1, the pixel electrode of the fourth pixel R (or second red pixel) has the second electrode structure E2. That is, pixels having the first electrode structure E1 and pixels having the second electrode structure E2 are alternately disposed in the first direction X.

In the first column, the pixel electrode of the first pixel R has the first electrode structure E1, the pixel electrode of the second pixel R has the second electrode structure E2, the pixel electrode of the third pixel R has the first electrode structure E1, and the pixel electrode of the fourth pixel R has the second electrode structure E2. That is, pixels having the first electrode structure E1 and pixels having the second electrode structure E2 are alternately disposed in the second direction Y.

Referring to FIG. 7, in the liquid crystal display 1000, the pixel electrodes of pixels adjacent in the second direction Y have the same electrode structure, and the pixel electrodes of pixels immediately adjacent in first direction X have different pixel electrode structures.

In each row, the pixel electrode of the first pixel R (or first red pixel) has the first electrode structure E1, the pixel electrode of the second pixel G (or first green pixel) has the second electrode structure E2, the pixel electrode of the third pixel B (or first blue pixel) has the first electrode structure E1, and the pixel electrode of the fourth pixel R (or second red pixel) has the second electrode structure E2. That is, pixels having the first electrode structure E1 and pixels having the second electrode structure E2 are alternately disposed in the first direction X.

The pixel electrode of each pixel of the first column has the first electrode structure E1, the pixel electrode of each pixel of the second column has the second electrode structure E2, the pixel electrode of each pixel of the third column has the first electrode structure E1, and the pixel electrode of each pixel of the fourth column has the second electrode structure E2. That is, the pixel electrode of each pixel disposed in an odd-numbered column has the first electrode structure E1, and the pixel electrode of each pixel disposed in an even-numbered column has the second electrode structure E2.

Figure 8:
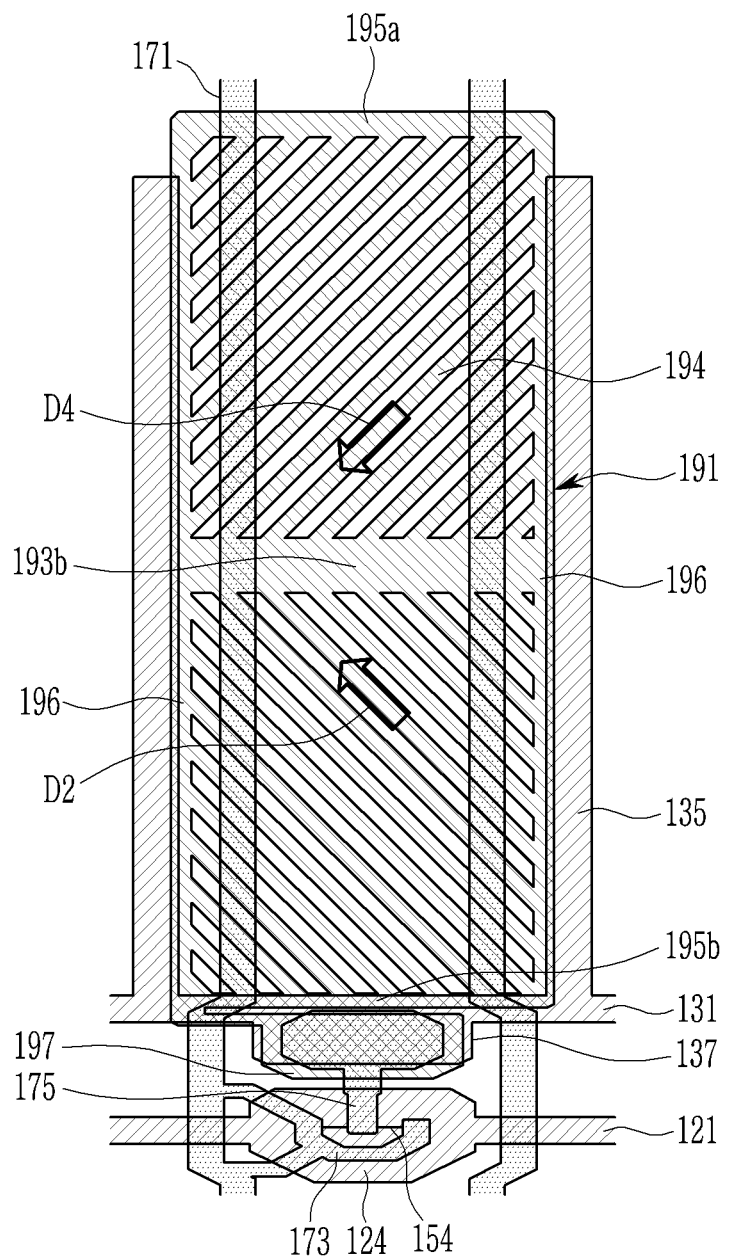
FIG. 8 is a view schematically showing a layout of one pixel of a liquid crystal display according to an embodiment.
Figure 9:
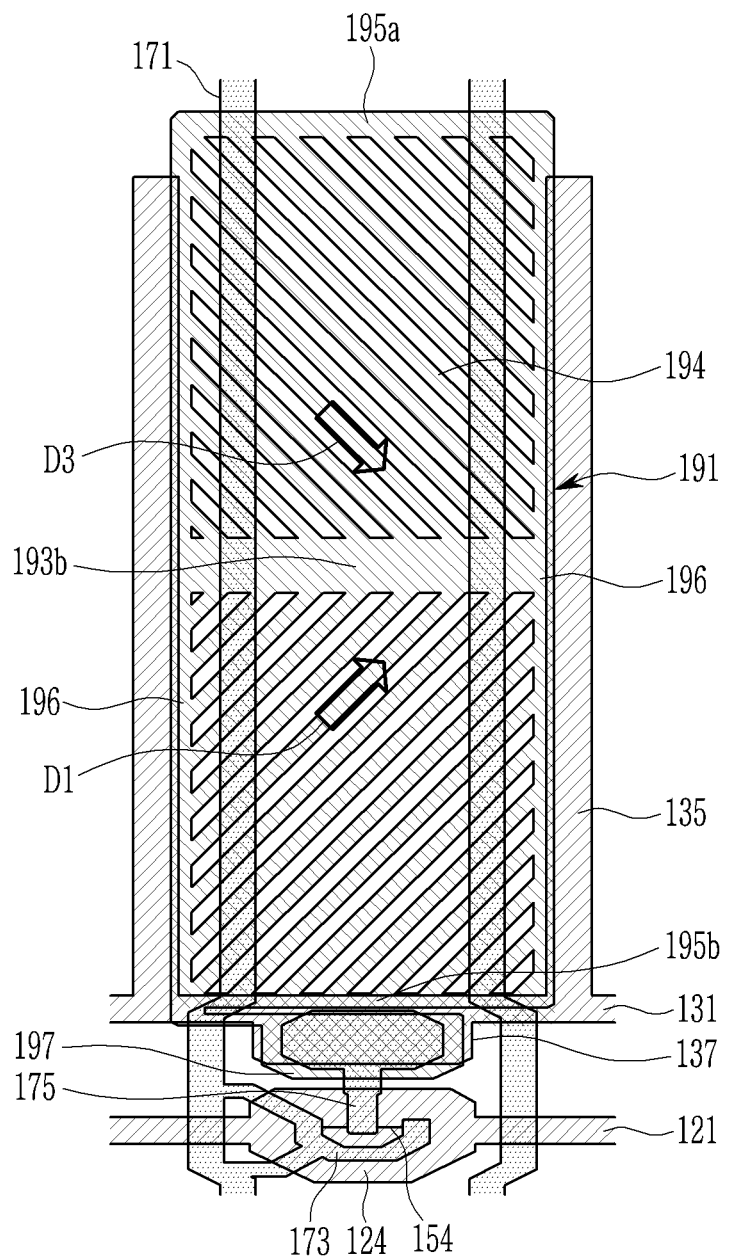
FIG. 9 is a view schematically showing a layout of one pixel of a liquid crystal display according to an embodiment.

Each of FIG. 8 and FIG. 9 is a plan view schematically showing a layout of one pixel of a liquid crystal display according to an embodiment. The pixel electrode included in the pixel according to FIG. 8 has a first electrode structure E1, and the pixel electrode included in the pixel according to FIG. 9 has a second electrode structure E2. In FIG. 8 and FIG. 9, the pixel has one integral pixel electrode that is not separated.

Referring to FIG. 8, the structure of the pixel may include elements analogous to or identical to elements described with reference to FIG. 3. Description of same or analogous elements and/or structures may not be repeated.

The pixel electrode 191 includes a transverse stem portion 193b, minute branch portions 194, a first transverse connection portion 195a, a second transverse connection portion 195b, a longitudinal connection portion 196, and a protruding portion 197. The pixel electrode 191 is an integral electrode that is not separated.

The transverse stem portion 193b extends in the horizontal direction, and minute branch portions 194 extend in inclined directions from the transverse stem portion 193b. The first transverse connection portion 195a connects the upper portion of the longitudinal connection portion 196 and ends of minute branch portions 194, and the second transverse connection portion 195b connects the lower portion of the longitudinal connection portion 196 and ends of minute branch portions 194. The longitudinal connection portion 196 is connected to ends of minute branch portions 194, and the protruding portion 197 is connected to the drain electrode 175 portion overlapping the extension portion 137 of the storage electrode line 131.

The outer boundary of the pixel electrode 191 is substantially a quadrangle, and the corresponding area is divided into an upper region and a lower region based on the transverse stem portion 193b.

In the upper region, minute branch portions 194 obliquely extend toward upper right from the transverse stem portion 193b; in the lower region, minute branch portions 194 obliquely extend toward lower right from the transverse stem portion 193b. A minute branch portion 194 may form the angle of approximately 45 degrees or 135 degrees with the transverse stem portion 193b.

The liquid crystal layer (not shown) contains liquid crystal molecules that are arranged parallel to minute branch portions 194. Since minute branch portions 194 extend in different directions in the left region and the right region of the pixel electrode 191, the domain directions of the liquid crystal molecules in the left region and the right region of the pixel electrode 191 are different from each other. Specifically, in the upper region and the lower region of the pixel electrode 191, the liquid crystal molecules are laid toward the transverse stem portion 193b, and the liquid crystal molecules have a fourth domain direction D4 in the upper region and have a second domain direction D2 in the lower region of the pixel electrode 191. The fourth domain direction D4 is toward the lower left based on the gate line 121, and the second domain direction D2 is toward the upper left based on the gate line 121.

Referring to FIG. 9, the structure of the pixel may include elements that are analogous to or identical to elements described with reference to FIG. 4. Description of same or analogous elements and/or structures may not be repeated.

The pixel electrode 191 includes a transverse stem portion 193b, minute branch portions 194, a first transverse connection portion 195a, a second transverse connection portion 195b, a longitudinal connection portion 196, and a protruding portion 197. The pixel electrode 191 is an integral electrode that is not separated.

The transverse stem portion 193b extends in the horizontal direction, and minute branch portions 194 extend in inclined directions from the transverse stem portion 193b. The first transverse connection portion 195a connects the upper portion of the longitudinal connection portion 196 and ends of minute branch portions 194, and the second transverse connection portion 195b connects the lower portion of the longitudinal connection portion 196 and ends of minute branch portions 194. The longitudinal connection portion 196 is connected to ends of minute branch portions 194, and the protruding portion 197 is connected to the drain electrode 175 portion overlapping the extension portion 137 of the storage electrode line 131.

The outer boundary of the pixel electrode 191 is substantially a quadrangle, and the corresponding area is divided into an upper region and a lower region based on the transverse stem portion 193b.

In the upper region, minute branch portions 194 obliquely extend toward upper left from the transverse stem portion 193b; in the lower region, minute branch portions 194 obliquely extend toward upper left from the transverse stem portion 193b. A minute branch portions 194 may form the angle of approximately 45 degrees or 135 degrees with the transverse stem portion 193b.

The liquid crystal layer (not shown) contains the liquid crystal molecules that are arranged parallel to minute branch portions 194. Since minute branch portion 194 extends in different directions in the upper region and the lower region of the pixel electrode 191, the domain directions of the liquid crystal molecules in the upper region and the lower region of the pixel electrode 191 are different from each other. Specifically, in the upper region and the lower region of the pixel electrode 191, the liquid crystal molecules are laid toward the transverse stem portion 193b, and the liquid crystal molecules have a third domain direction D3 in the upper region and have a first domain direction D1 in the lower region of the pixel electrode 191. The third domain direction D3 is toward the lower right based on the gate line 121, and the first domain direction D1 is toward the upper right based on the gate line 121.

FIG. 10 is a plan view schematically showing a pixel electrode voltage arrangement of a liquid crystal display according to an embodiment.

Referring to FIG. 10, the liquid crystal display 1000 according to an embodiment includes a plurality of pixels.

The plurality of pixels includes first-color pixels R, second-color pixels G, and third-color pixels B. The pixels are disposed in a plurality of rows (extending in a first direction X) and a plurality of columns (extending in a second direction Y). In a first row, a pattern includes a pixel R, a pixel G, and a pixel B sequentially disposed in the first direction X, and the pattern is repeated in the first direction X. The first direction X is different from (e.g., perpendicular to) the second direction Y.

Each pixel R may be a red pixel representing red, and each pixel G may be a green pixel representing green, each pixel B may be a blue pixel representing blue.

Each of pixels R, G, and B includes one pixel electrode, and a voltage may be applied to the pixel electrode of each pixel R, G, and B. In an embodiment, pixels with pixel electrodes receiving the high voltage and pixels with pixel electrodes receiving the low voltage (lower than the high voltage) are alternately disposed in the first direction X and in the second direction Y. That is, the high voltage and the low voltage are respectively applied to the pixel electrodes of every two pixels immediately adjacent to each other in the first direction X or in the second direction Y.

In the first row, the high voltage H is applied to the pixel electrode of the first pixel R (or first red pixel), the low voltage L is applied to the pixel electrode of the second pixel G (or first green pixel), the high voltage H is applied to the pixel electrode of the third pixel B (the first blue pixel), and the low voltage L is applied to the pixel electrode of the fourth pixel R (or the second red pixel). That is, pixels with pixel electrodes receiving the high voltage H and pixels with pixel electrodes receiving the low voltage L are alternately disposed in the first direction X.

In the first column, the high voltage H is applied to the pixel electrode of the first pixel R, the low voltage L is applied to the pixel electrode of the second pixel R, the high voltage H is applied to the pixel electrode of the third pixel R, and the low voltage L is applied to the pixel electrode of the fourth pixel R. That is, pixels with pixel electrodes receiving the high voltage H and pixels with pixel electrodes receiving the low voltage L are alternately disposed in the second direction Y.

In embodiments, a liquid crystal display according to FIG. 2, a liquid crystal display according to FIG. 5, a liquid crystal display according to FIG. 6, and/or a liquid crystal display according to FIG. 7 may have the voltage application arrangement according to FIG. 10.

Table 2 shows average values upper-lower average luminance and the left-right average luminance of a liquid crystal display device according to each of Embodiment 3, Embodiment 4, Embodiment 5, and Embodiment 6.

Embodiment 3, Embodiment 4, Embodiment 5, and Embodiment 6 may each have the voltage application arrangement according to FIG. 10 and may respectively have pixel electrode structure arrangements according to FIG. 2, FIG. 5, FIG. 6, and FIG. 7.

TABLE 2

| | Embodiment 3 | | Embodiment 4 | | Embodiment 5 | | Embodiment 6 | |
| --- | --- | --- | --- | --- | --- | --- | --- | --- |
| | upper-lower | left-right | upper-lower | left-right | upper-lower | left-right | upper-lower | left-right |
| Average luminance ($cd/m^2$) | 39.6 | 43.9 | 39.6 | 43.9 | 39.6 | 43.9 | 39.9 | 43.9 |

Referring to Table 2, in each of Embodiment 3, Embodiment 4, Embodiment 5, and Embodiment 6, the difference between the upper-lower average luminance and the left-right average luminance is 4.3 $cd/m^2$ or 4.0 $cd/m^2$, so it may be confirmed that the difference between the upper-lower luminance and the left-right luminance is insignificant. Since the difference between the upper-lower average luminance and the left-right average luminance is insignificant, each of Embodiment 3, Embodiment 4, Embodiment 5, and Embodiment 6 may provide satisfactory lateral visibility.

While example embodiments have been described, practical embodiments are not limited to the described embodiments. Practical embodiments are intended to cover various modifications and equivalent arrangements within the scope of the appended claims.

What is claimed is:

1. A liquid crystal display device comprising:
    a first pixel row comprising a first first-color pixel, a second first-color pixel, and a third first-color pixel;
    a second pixel row comprising a fourth first-color pixel, a fifth first-color pixel, and a sixth first-color pixel; and
    a third pixel row comprising a seventh first-color pixel, an eighth first-color pixel, and a ninth first-color pixel,
    wherein each of the first pixel row, the second pixel row, and the third pixel row extends in a first direction,
    wherein the second pixel row is disposed between the first pixel row and the third pixel row and immediately neighbors each of the first pixel row and the third pixel row,
    wherein the first first-color pixel, the fourth first-color pixel, and the seventh first-color pixel are aligned in a second direction different from the first direction,
    wherein the second first-color pixel, the fifth first-color pixel, and the eighth first-color pixel are aligned in the second direction,
    wherein the third first-color pixel, the sixth first-color pixel, and the ninth first-color pixel are aligned in the second direction,
    wherein the second first-color pixel is disposed between the first first-color pixel and the third first-color pixel,
    wherein each of a pixel electrode of the first first-color pixel, a pixel electrode of the third first-color pixel, a pixel electrode of the fifth first-color pixel, a pixel electrode of the seventh first-color pixel, and a pixel electrode of the ninth first-color pixel is configured to receive a high voltage for a gray level,
    wherein each of a pixel electrode of the second first-color pixel, a pixel electrode of the fourth first-color pixel, a pixel electrode of the sixth first-color pixel, and a pixel electrode of the eighth first-color pixel is configured to receive a low voltage for a gray level lower than the high voltage for a gray level, and wherein liquid crystal molecules in each pixel in each of the first pixel row, the second pixel row, and the third pixel row have two domain directions.

2. The liquid crystal display device of claim 1, wherein the first pixel row further comprises a first second-color pixel and a first third-color pixel both disposed between the first first-color pixel and the second first-color pixel, the first second-color pixel is disposed between the first first-color pixel and the first third-color pixel, and a pixel electrode of the first third-color pixel is configured to receive the high voltage for a gray level.

3. The liquid crystal display device of claim 2, wherein a pixel electrode of the first second-color pixel is configured to receive the high voltage for a gray level or the low voltage for a gray level.

4. The liquid crystal display device of claim 3, wherein the pixel electrode of the first first-color pixel has a first electrode structure, each or one of the pixel electrode of the second first-color pixel and the pixel electrode of the fourth first-color pixel has a second electrode structure, and a plan view of the first electrode structure is a mirror image of a plan view of the second electrode structure.

5. The liquid crystal display device of claim 4, wherein the first electrode structure includes:

a longitudinal stem portion extending in the second direction; and a plurality of minute branch portions extending obliquely from the longitudinal stem portion.

6. The liquid crystal display device of claim 5, wherein the plurality of minute branch portions comprises a first set of minute branch portions and a second set of minute branch portions, and a plan view of the first set of minute branch portions is a mirror image of a plan view of the second set of minute branch portions with reference to the longitudinal stem portion.

7. The liquid crystal display device of claim 6, wherein a plan view of minute branch portions of the first electrode structure is a mirror image a plan view of minute branch portions of the second electrode structure according to the second direction.

8. The liquid crystal display device of claim 7, wherein each pixel electrode in the first pixel row has the first electrode structure, each pixel electrode in the second pixel row has the second electrode structure, and each pixel electrode in the third pixel row has the first electrode structure.

9. The liquid crystal display device of claim 7, wherein each pixel electrode of the first first-color pixel, the first second-color pixel, the first third-color pixel, and the third first-color pixel has the first electrode structure, and the pixel electrode of the second first-color pixel has the second electrode structure.

10. The liquid crystal display device of claim 7, wherein each pixel electrode of the first first-color pixel, the first third-color pixel, and the third first-color pixel has the first electrode structure, each pixel electrode of the first second-color pixel, the second first-color pixel, and the fourth first-color pixel has the second electrode structure.

11. The liquid crystal display device of claim 7, wherein each pixel electrode of the first first-color pixel, the first third-color pixel, the third first-color pixel, the fourth first-color pixel, the sixth first-color pixel, the seventh first-color pixel, and the ninth first-color pixel has the first electrode structure, and each pixel electrode of the first second-color pixel, the second first-color pixel, the fifth first-color pixel, and the eighth first-color pixel has the second electrode structure.

12. The liquid crystal display device of claim 4, wherein the first electrode structure includes:

a transverse stem portion extending in the first direction; and a plurality of minute branch portions extending obliquely from the transverse stem portion.

13. The liquid crystal display device of claim 12, wherein the plurality of minute branch portions comprises a first set of minute branch portions and a second set of minute branch portions, and a plan view of the first set of minute branch portions is a mirror image of a plan view of the second set of minute branch portions with reference to the transverse stem portion.

14. The liquid crystal display device of claim 13, wherein a plan view of minute branch portions of the first electrode structure is a mirror image a plan view of minute branch portions of the second electrode structure according to the first direction.

15. The liquid crystal display device of claim 14, wherein each pixel electrode in the first pixel row has the first electrode structure, each pixel electrode in the second pixel row has the second electrode structure, and each pixel electrode in the third pixel row has the first electrode structure.

16. The liquid crystal display device of claim 14, wherein each pixel electrode of the first first-color pixel, the first second-color pixel, the first third-color pixel, and the third first-color pixel has the first electrode structure, and the pixel electrode of the second first-color pixel has the second electrode structure.

17. The liquid crystal display device of claim 14, wherein each pixel electrode of the first first-color pixel, the first third-color pixel, and the third first-color pixel has the first electrode structure, each pixel electrode of the first second-color pixel, the second first-color pixel, and the fourth first-color pixel has the second electrode structure.

18. The liquid crystal display device of claim 14, wherein each pixel electrode of the first first-color pixel, the first third-color pixel, the third first-color pixel, the fourth first-color pixel, the sixth first-color pixel, the seventh first-color pixel, and the ninth first-color pixel has the first electrode structure, and each pixel electrode of the first second-color pixel, the second first-color pixel, the fifth first-color pixel, and the eighth first-color pixel has the second electrode structure.

19. The liquid crystal display device of claim 1, wherein the high voltage for a gray level and the low voltage for a gray level satisfy a gamma value of the liquid crystal display device, if combined for every gray level.

20. The liquid crystal display device of claim 19, wherein the gamma value of the liquid crystal display device is 2.2 or 2.4, and the low voltage for a gray level satisfies one of gamma values from 3.0 to 4.0.

* * * * *